United States Patent [19]

Johnson

[11] 4,097,959
[45] Jul. 4, 1978

[54] LOAD SUPPORTING HINGE STRUCTURE

[75] Inventor: Larry K. Johnson, Sterling, Ill.

[73] Assignee: Lawrence Brothers, Inc., Sterling, Ill.

[21] Appl. No.: 783,324

[22] Filed: Mar. 31, 1977

[51] Int. Cl.² .................................................. E05D 11/04
[52] U.S. Cl. ......................................... 16/136; 16/169;
308/174; 308/230
[58] Field of Search .......................... 16/136, 168, 169;
308/174, 227, 230

[56] References Cited

U.S. PATENT DOCUMENTS

| 179,409 | 7/1876 | Hopkins | 16/136 |
| 1,800,238 | 4/1931 | Woernle | 16/136 |
| 1,931,871 | 10/1933 | Large | 308/230 |
| 3,118,171 | 1/1964 | Parsons | 16/136 |
| 3,465,380 | 9/1969 | Foltz | 16/136 |

FOREIGN PATENT DOCUMENTS

| 1,845 | 8/1900 | Austria | 16/136 |
| 561,296 | 10/1957 | Belgium | 16/136 |
| 1,067,265 | 10/1973 | Fed. Rep. of Germany | 308/174 |
| 26,141 of | 1903 | United Kingdom | 16/136 |
| 1,319,680 | 6/1973 | United Kingdom | 308/174 |

*Primary Examiner*—James Kee Chi
*Attorney, Agent, or Firm*—Olson, Trexler, Wolters, Bushnell & Fosse, Ltd.

[57] ABSTRACT

There is disclosed an improved load supporting hinge structure which includes bearing units disposed between adjacent knuckles of the leaves of the hinge to afford both the desired support and smooth operation thereof. Each of the knuckles of the hinge structure includes a central axial bore, the bores being aligned coaxially. Each of the ball-bearing units includes an axially outer and an axially inner race member and a train of bearing members mounted for movement therebetween. The respective race members are constructed so that the bearing unit can accommodate both vertical and horizontal loads, with uniform loading of the load supporting bearing elements being attained by provision for slight relative movement between the race members and the bearing elements.

8 Claims, 4 Drawing Figures

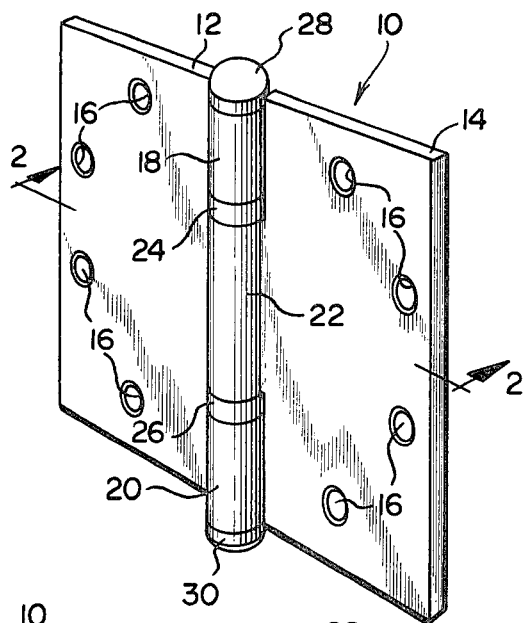
FIG. 1
FIG. 2
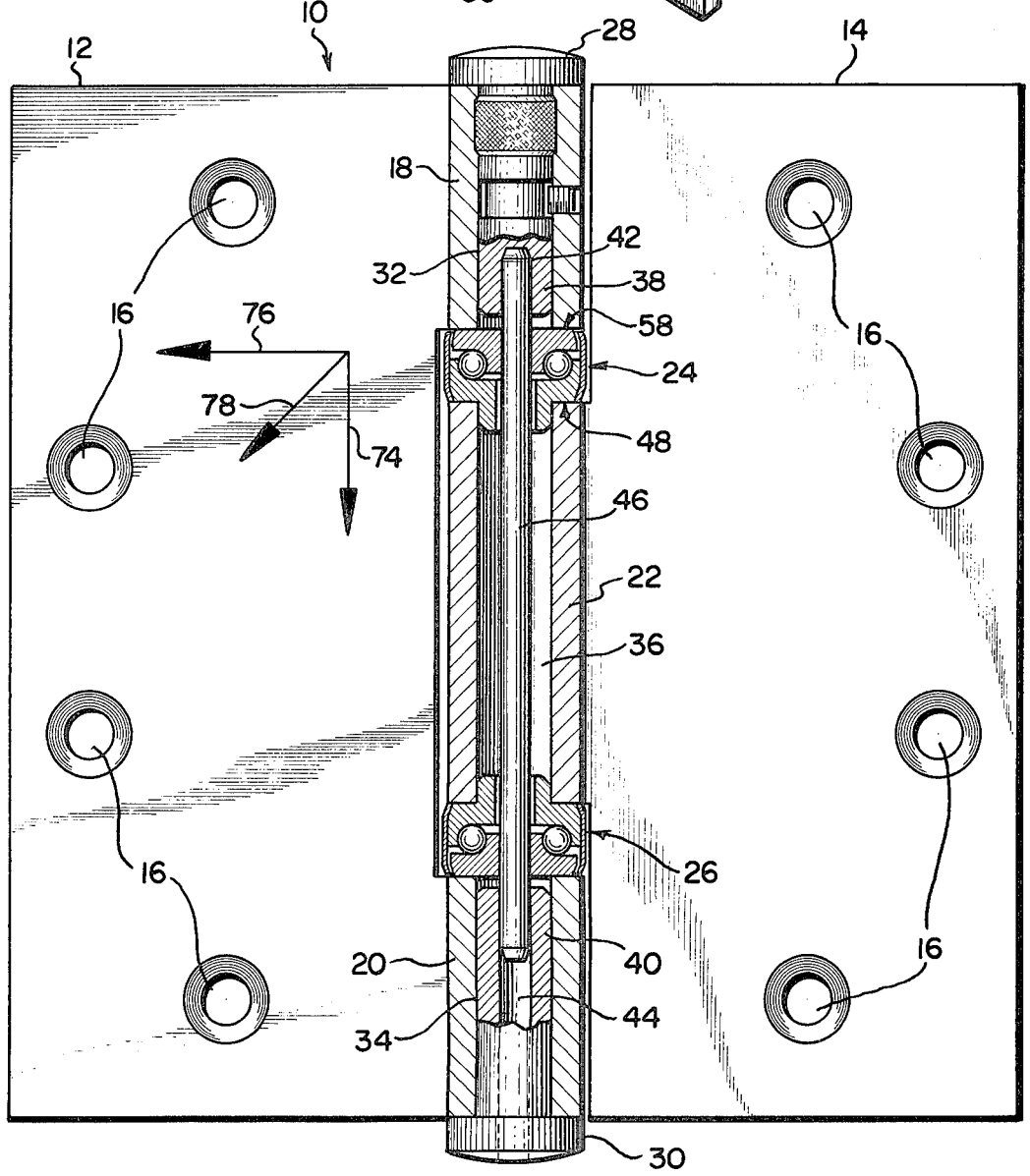

LOAD SUPPORTING HINGE STRUCTURE

BACKGROUND OF THE INVENTION

This invention relates generally to hinges and more particularly to a hinge structure which includes bearing means, such as ball-bearing units located between adjacent knuckles of the hinge leaves to provide both smooth operation and load support.

Residential and office doors are conventionally hung for swinging operation about a vertical axis of butt hinges or the like. The size and the weight of such doors often tends to exert a considerable axial load or force component on the hinges as well as a horizontal or radial load component. If a conventional butt hinge is used the result of these radial and axial loads is the creation of considerable friction between the adjacent engaged surfaces of the knuckles of the hinge, as well as between those portions of the knuckle bores which are in contact with the hinge pin or pintle. This friction hampers smooth operation and also produces wear. Applying grease or oil to these areas of contact may help to reduce the wear on the adjacent parts on a relatively small or light door, but is of little use in the case of a relatively large or heavy door, or a door which is subject to frequent opening and closing about the hinges.

It is also known in the art to use bearing units or the like disposed between the adjacent knuckles of a hinge to accommodate the axial or vertical load or force component, but these bearing units fail to accommodate the radial or horizontal component of force or load and were ineffective where heavy doors were being used. To overcome this problem of horizontal load, spacing and support bushings disposed between the knuckle bores and the pintle have been used. These also proved unsatisfactory for all situations as friction and resultant wear continued to occur in the areas where such bushings engage and rotate against surfaces of either the pintle or the knuckle bores.

The next step in the art was to employ bearing units which could accommodate to certain degrees both radial and axial loading. Two examples of this type of hinge can be found in U.S. Pat. Nos. 3,465,380 and 3,118,171. These designs while more effective than the prior construction still were subject to inherent problems. In this regard at least one race member included an annular groove defining both inner and outer peripheral shoulders which fixed the relative radial position of the ball bearing elements. While the arrangement did not effect the ability of the bearing units to accommodate axial loads, performance under heavy radial or horizontal loading was not always satisfactory.

More specifically, with the above-discussed arrangement relative movement between the respective race members and the bearing units is restricted by the fixed orientation of the ball bearing in the groove. Accordingly, when radial load is applied, the ball bearings which accommodate said load are not loaded uniformly, that is to say that when a radial load is encountered only one-half of the ball units will accommodate said load while an axial or thrust force will load all of the bearing elements. Thus, due to the use of the groove for the balls and the lack of relative movement these bearing elements which are not accommodating the vertical load directly will be forced into engagement with one of the groove shoulders. This tends to produce wear, unwanted noise and hampers smooth operation of the hinge.

SUMMARY OF THE PRESENT INVENTION

The present invention provides a hinge structure having a bearing arrangement which overcomes the problem inherent in the prior art, and provides for improved operation. Briefly, said hinge structure includes a pair of leaves, one of the leaves including at least a pair of spaced end knuckles and the other at least one intermediate knuckle. The knuckles include central axial bores, which are aligned coaxially and held in assembly by a pin or pintle member. End caps are disposed in the bores of the end knuckles and the pintle is attached to said end caps so that pintle, end caps and end knuckles rotate in unison. Bearing units are disposed between each of the end knuckles and an adjacent intermediate kunckle, each bearing unit comprising a first, axially inner race member and a second, axially outer race member. The axially inner race member includes an axially extending flange received in the central bore of the intermediate knuckle to rotate in unison therewith and an axially extending shoulder portion disposed about the outer periphery of the race member to define a first raceway, with said raceway being free of a corresponding inner shoulder. The second, axially outer race member includes an axially extending shoulder portion disposed about the inner periphery of the race member to define a second raceway, and is free of a corresponding outer shoulder. As such, the inner periphery of the first raceway and the outer periphery of the second are substantially flat. Each of the raceways includes a central aperture therethrough, the pintle being in engagement with the bore of the axially outer raceway for rotation and unison therewith but spaced from the larger diameter bore of the lower raceway to provide for relative movement. A plurality of bearing elements such as ball bearings are disposed between the first and second raceways.

Due to the placement of the respective shoulders and the provision of a substantially flat raceway opposite said shoulders, the bearing arrangement is capable of slight relative movement in response to the application of a load. Also, with regard to radial loads, this arrangement assures that the individual ball or bearing elements which accommodate said load are loaded equally. Further, as will be explained more fully, the above-noted construction and provision for relative movement enables the bearing elements to shift or adjust slightly to varying load conditions, without destroying the equalized loading. All of which serve to increase the life of the bearing, improve its performance or operation in service.

The foregoing, as well as other objects and advantages of the present invention will become apparent from a consideration of the following description together with the accompanying drawings wherein like reference numerals are used throughout to designate similar elements and components.

BRIEF DESCRIPTION OF THE DRAWINGS

FIG. 1 is a perspective view of a hinge structure incorporating features of the present invention;

FIG. 2 is an enlarged front elevation view, with the hinge barrel and portions of the bearing elements partially in section;

DETAILED DESCRIPTION OF THE INVENTION

Figure 3:
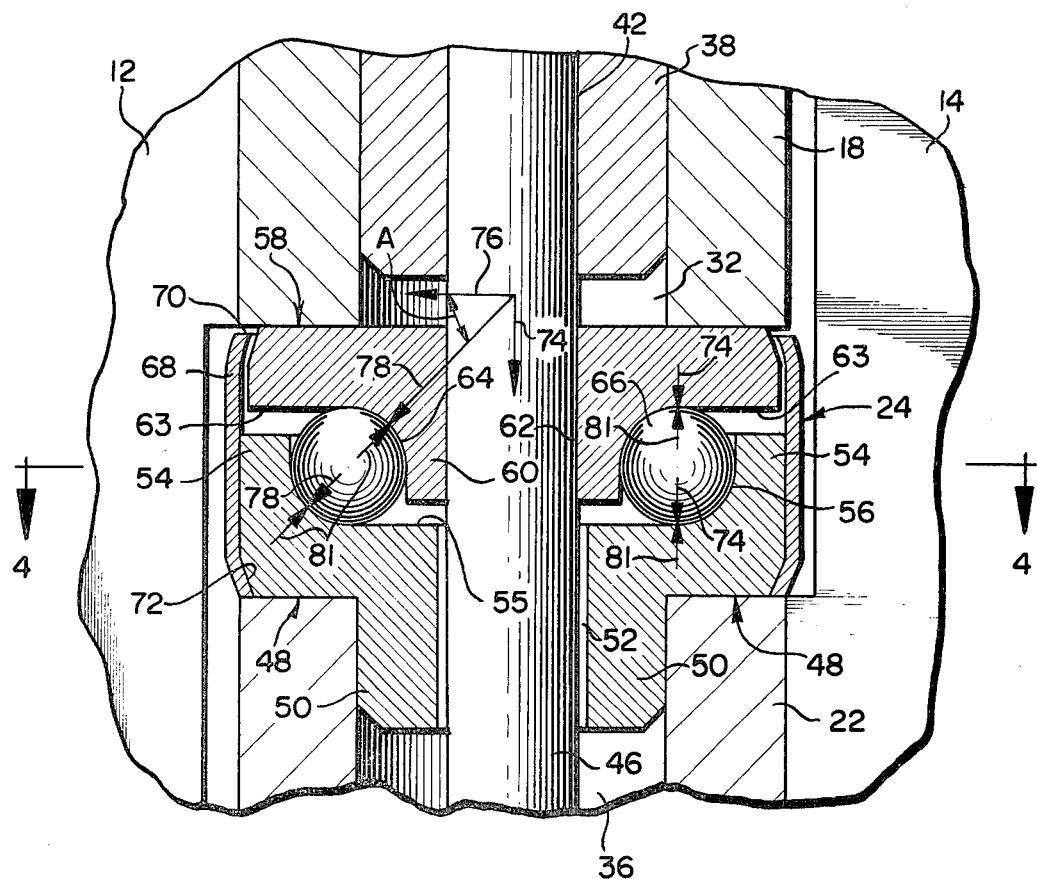
FIG. 3 is an enlarged view of a portion of the hinge as shown in FIG. 2.

Referring now to FIG. 1, hinge structure 10 includes a pair of relatively planar leaves 12 and 14 including means such as openings 16 for mounting the leaves 12 and 14, as for example, to a door and a jamb (not shown), respectively. The leaf 12 is provided with a pair of spaced, generally tubular end knuckles 18 and 20. Similarly, leaf 14 is provided with a generally tubular intermediate knuckle 22, medially disposed with respect to the end knuckles 18 and 20. Bearing means or units 24 and 26 are disposed between each of the end knuckles 18 and 20, respectively, and intermediate knuckle 22. End caps 28 and 30 are attached to end knuckles 18 and 20, respectively, in a manner to be described in detail below. While the end caps 28 and 30 are of the "button" type with the head portions thereof exposed, flush type end caps could be employed. Leaf 12 is spaced radially from knuckle 22 and bearing units 24 and 26 at its central portion. Similarly, leaf 14, is spaced radially from knuckles 18 and 20 at its end portions. While a hinge having three knuckles is shown and described herein, it should be understood that the invention is not limited thereto, but may be employed in hinges of other types, for example, one having five knuckles.

Turning now to FIG. 2, additional details of the hinge structure 10 are illustrated. The end knuckles 18 and 20 and the intermediate knuckle 22 include central axial bores 32, 34 and 36, respectively, which are of substantially equal diameter, and, in the assembled condition are aligned substantially coaxially. End caps 28 and 30 which include generally cylindrical portions 38 and 40, respectively, are engaged in the bores 32 and 34 of the end knuckles 18 and 20 for rotation in unison therewith. The cylindrical portions 38 and 40 are provided with central bores 42 and 44, respectively, and a pin or pintle member 46 extends axially between end cap members 28 and 30, with its opposite ends engaged in the bores 42 and 44 for rotation in unison therewith. The pintle 46 in conjunction with the end caps 28 and 30 serve to maintain the hinge elements in the assembled condition. It will be noted that the diameter of pin or pintle 46 is substantially less than that of the bore 36 of the intermediate knuckle 22, so that the pintle 46 may rotate independently of the intermediate knuckle 22 and the leaf 14.

Figure 4:
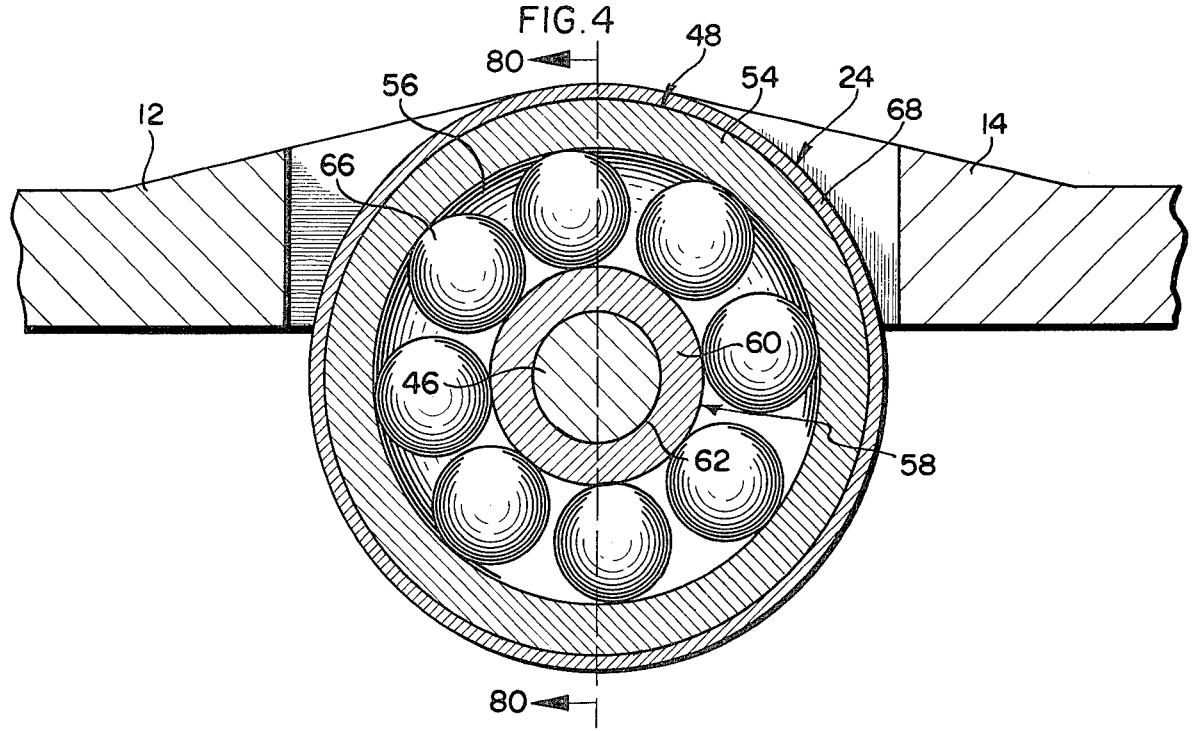
FIG. 4 is a partial sectional view taken generally along line 4—4 of FIG. 3.

Attention is now directed to FIGS. 3 and 4 wherein the bearing units 24 and 26 are illustrated in detail. It will be noted, in conjunction with the illustration of FIG. 2, that the bearing units 24 and 26 are of identical construction, and symmetrically disposed. Therefore, only the bearing unit 24 will be described in detail, it being understood that unit 26 is of similar construction and operation.

The bearing assembly 24 includes a first, axially inner race member 48 which is generally annular in cross-section and includes a radially inward, axially extending flange 50 engaged in the central bore 36 of the intermediate knuckle 22. This engagement may be in the form of a press or interference fit so that the race member 48 will rotate in unison with said knuckle 22. The flange 50 defines a central aperture 52 of the race member 48 which is of larger diameter than the pintle 46 so that race member 48 is free to rotate independently of the pintle 42. The race member 48 further includes a radially outward axially extending shoulder portion 54 about its outer periphery. The inner periphery of race member 48, designated 55 is substantially flat and free of any corresponding shoulder. Accordingly, the shoulder 54 and flat portion 55 serve to define a first raceway 56.

The unit 24 includes a second, axially outer race member 58 of a generally annular cross-section and having a radially inner, axially extending shoulder portion 60 disposed about its inner periphery to define a central bore 62 in which is engaged the pintle 46 for rotation in unison therewith. The outer periphery 63 is substantially flat and cooperates with the shoulder portion 60 to define radially outward facing second raceway 64.

Intermediate the respective raceways 56 and 64 there is disposed a plurality of bearing elements such as ball bearing 66. A generally annular protective cover or bearing shell 68 extends about the radially outer periphery of race members 48 and 58, and is attached to the race member 48 for rotation in unison therewith, and is spaced from race member 58 to rotate relative thereto a small quantity of lubricant (not shown) normally will be included to lubricate the ball bearings in service. The shell 68 is attached to race member 48 by a flange or lip portion 70. A corresponding flange 72 is provided at the opposite end of said shell 68 which flange overlaps the outer portion of race member 58 and will seal the unit against leakage of any lubricant.

It will be appreciated that bearing unit 26, which is disposed between knuckles 20 and 22, as best seen in FIG. 2, is of the same construction as bearing unit 24 and is disposed symmetrically with bearing unit 24 with respect to the other components of the hinge structure 10. Thus, the axial and radial relationship among the various elements stated above with respect bearing unit 24 are equally applicable to bearing unit 26.

For purposes of affording a more complete understanding of the invention, it is advantageous now to provide a functional description of the mode in which the component parts thus far described cooperate.

Referring again to the hinge structure 10 of FIG. 2, the leaf 12 may be attached to a door (not shown), which is hung on a door jamb (not shown), by leaf 14 being attached to the door jamb. The door exerts on the hinge structure 10 both a vertical or axial force component in a direction indicated by arrow 74, and a horizontal or radial force component, in a direction indicated by arrow 76. Thus, the resultant or actual force exerted by the door becomes an "angular" force as indicated by the arrow 78. These forces must be accommodated by the bearing units 24 and 26 in order to prevent wear and provide smooth, trouble-free operation. Of course, the heavier the door, the more severe the problem.

Looking now at FIG. 3, and the bearing unit 24 shown therein, the knuckle 18 is an integral part of the leaf 12 attached to the door and, therefore, transmits the aforementioned vertical or axial force component 74 as a thrust load to the bearing unit 24, upon which the knuckle 18 rests. Similarly, the knuckle 18 transmits the horizontal or radial force component 76 to the end cap member 38 and pintle 46 engaged therein. The pintle 46 in turn transmits the radial force to race member 58 by virtue of the snug fit between the pintle 46 and the axially outer race member 58. Thus, the resultant force 78 is transmitted by race member 58 and shoulder 60 thereof to the raceway 64 defined thereby and thence to the ball bearings 66. While the vertical load 74 is accommodated by all of the balls 66, it should be noted that the horizontal force component 76 is accommodated by only those ball bearings 66 located in the left half of the bearing unit 24 as viewed and as indicated by the section line 80—80 of FIG. 4. In this regard, with reference to FIGS. 3 & 4, it can be seen that the radial force component 76 tends to separate the raceways 56 and 64 from the balls 66 in the right half portion. Thus, substantially the entire force 78 imposed upon hinge structure 10 by the door is carried by the ball bearings 66, resulting in substantially no forces being carried by the other elements of the structure as, for example, the adjacent knuckles or the pintle 46.

It will also be apparent that the ball bearings 66 are substantially the only portions of the hinge structure 10 which move relative to adjacent touching parts, specifically, the race members. Therefore, friction between moving parts in the hinge structure 10 is virtually eliminated except with respect to the bearings unit 24 and 26 which are especially adapted to carry the loading forces and minimize friction.

Most importantly, due to the provision of the substantially flat portions 55 and 63 on the inner periphery of race member 48, and the outer periphery of race member 58, the balls 66 are not maintained captive with respect to either race member, as is the case with the prior art devices. Accordingly, the respective elements, i.e. balls 66 and race members 48 and 58 are free to move relative to each other to accommodate the angular load 78, regardless of its vector of application. That is to say, that the radial and vertical loads 74 and 76 encountered will not always be equal, so that the vector 78 may be disposed at varying angular relationships to the horizontal as indicated by angle A. With the bearing construction 24, as described not only can these variable conditions be accommodated, but equal loading of the individual balls 66 is also obtained, as indicated by the arrows 81 which represent the force components in resistance to the resultant load 78 on each ball. In this regard, since the ball 66 to the right of FIG. 3 carries no radial load only the vertical load 74 is applied thereto.

Thus, through the provision of the hinge structure 10 including bearing units 24 and 26, according to the invention, a door hung thereby is properly supported so that it will operate smoothly and easily while avoiding wear due to friction to the pintle, knuckles and other elements thereof.

While a preferred embodiment of the present invention has been shown and described herein, various changes and modifications may occur to those skilled in the art, and are to be understood as forming a part of this invention insofar as they fall within the spirit and scope of the claims appended hereto.

The invention is claimed as follows:

1. A hinge structure comprising: a pair of leaves, one of said pair of leaves including at least a pair of spaced knuckles, the other of said pair of leaves including at least one intermediate knuckle, said spaced knuckles and intermediate knuckle having a central axial bore, pintle means disposed coaxially within said knuckles to maintain assembly of said leaves, said pintle means being connected to said spaced knuckles to rotate in unison therewith, and being spaced from the bore of said intermediate knuckle to rotate relative thereto, and bearing means disposed between each of said end knuckles and an adjacent intermediate knuckle whereby the axial and radial components of the loading forces created upon mounting of a door are transmitted from said leaves through said knuckles and pintle means to said bearing means and are accommodated by said bearing means to minimize friction and wear of said hinge structure, and improve performance thereof, at least one of said bearing means comprising a first, axially inner generally annular race member engaged with said intermediate knuckle for rotation in unison therewith, and a second, axially outer generally annular race member including a central aperture sized to be engaged with said pintle means for rotation in unison therewith, and a plurality of bearing elements disposed between said first and second race members, and first race member including an axially extending shoulder portion formed about the radially outer periphery thereof and including an inwardly facing arcuate surface portion merging smoothly with a substantially flat inner peripheral portion free of any shoulder means to confine said bearing elements and thereby defining a first raceway, and said second race member including an axially extending shoulder portion formed about the radially inner periphery thereof and including an outwardly facing arcuate portion merging smoothly with a substantially flat outer peripheral portion free of any shoulder means to confine said bearing elements, thereby defining a second raceway spaced from said first raceway, with said bearing elements engaged between said first and second raceways thereby providing a structural arrangement wherein the raceways are free to shift in accordance with the load placed thereon to accommodate both radial and thrust loading.

2. A hinge structure according to claim 1 wherein said bearing elements comprise ball bearings.

3. A hinge structure according to claim 1 wherein said knuckle bores are of substantially equal diameter.

4. A hinge structure according to claim 1 wherein end caps are employed which are disposed in the axially outer end of the spaced knuckles on said one leaf, and are engaged with said pintle means.

5. A hinge structure according to claim 4 wherein said pintle means comprises a generally cylindrical pin of smaller diameter than said knuckle bores and engaged in end cap bores for rotation in unison with said end caps.

6. A hinge structure according to claim 1 wherein said second race members are in engagement with said end knuckles to transmit said axial and radial forces from said leaves through said end knuckles to said ball bearings.

7. A hinge structure according to claim 1 including means for maintaining assembly of said bearing means comprising a generally annular bearing shell carried by said first race member and in overlapping engagement with said second race member for rotation in unison with said first race member while preventing axial separation of the bearing elements.

8. A hinge according to claim 1, wherein said bearing elements are spherical, and said arcuate surface portions on said first and second race members extend over an arc which is not greater than 90°.

* * * * *